C. M. STREETER & J. B. HECK.
WORK CLAMPING JAW.
APPLICATION FILED JAN. 23, 1914.
1,125,207.
Patented Jan. 19, 1915.
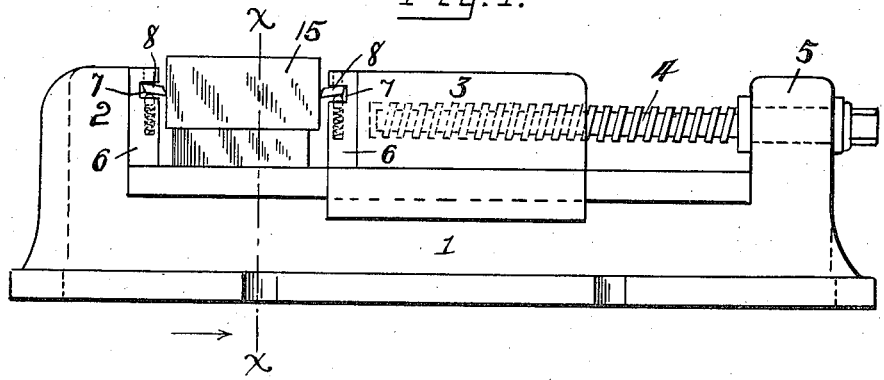
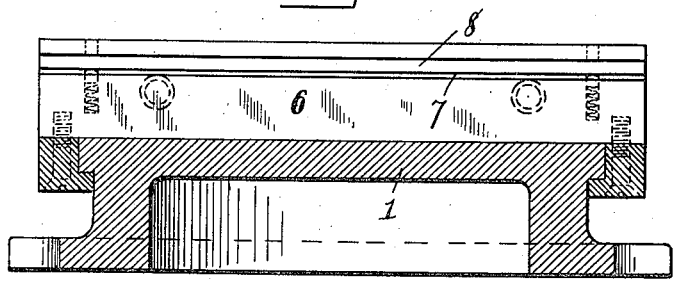
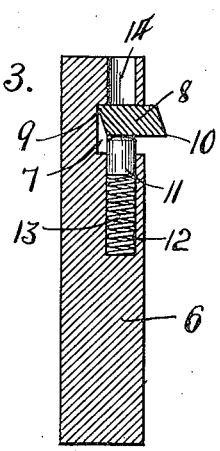
WITNESSES:
D. C. Walter
INVENTORS
Charles M. Streeter,
John B. Heck,
By Owen, Owen & Crampton,
Their attys.

UNITED STATES PATENT OFFICE.

CHARLES M. STREETER AND JOHN B. HECK, OF TOLEDO, OHIO.

WORK-CLAMPING JAW.

1,125,207. Specification of Letters Patent. Patented Jan. 19, 1915.

Application filed January 23, 1914. Serial No. 813,863.

*To all whom it may concern:*

Be it known that we, CHARLES M. STREETER and JOHN B. HECK, citizens of the United States, and residents of Toledo, in the county of Lucas and State of Ohio, have invented a certain new and useful Work-Clamping Jaw; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to work clamping means for use in connection with planing machines, gigs, and the like, and also for use in connection with bench vises, but is not restricted to such uses as it may be employed in any connection for which it may be adapted or appropriate.

In shop work considerable difficulty has been experienced in the use of machines of the class described due to the tendency of work to creep up when the holding jaws are tightened thereagainst, thus necessitating a frequent pounding down of the work during the clamping action.

The object of our invention is to obviate this objectionable feature by the provision, in connection with work clamping jaws or parts, of simple and efficient means for causing, or tending to cause, an inward movement of a work piece when being clamped.

The invention is fully described in the following specification, and while in its broader aspect, it is capable of embodiment in numerous forms, a preferred embodiment thereof is illustrated in the accompanying drawings, in which,—

Figure 1 is an elevation of a machine table with a pair of relatively movable work clamping jaws equipped with our invention associated therewith and in work clamping position. Fig. 2 is a section thereof on the line *x*, *x* in Fig. 1 with the work removed, and Fig. 3 is a vertical section of a face plate of one of the jaws with the work gripping means thereof in normal position.

Referring to the drawings, 1 designates the table portion of a machine, or it may comprise a bench, and is provided at one side with a fixed jaw 2 and in opposition thereto with a movable jaw 3, which has its movements toward and away from the jaw 2 guided in any suitable manner, as is well understood in the art. The movements of the jaw 3 are actuated by the turning of one or more screws 4, which are threaded into portions of the jaw 3 and are rotatably anchored against longitudinal movements in a table part 5.

Each of the jaws 2 and 3 is faced with a removable plate 6, which is secured thereto by screws or in any other suitable manner. Each face plate 6 is provided in the outer or exposed side thereof with a recess 7, which, in the present instance, extends longitudinally of the plate, preferably the full length thereof, and disposed therein is a work clamping member 8. This member is of bar form and is of less depth or thickness than the vertical width of the recess 7, and is of a greater width than the depth of the recess to permit its outer edge to project beyond the outer face of the plate 6 when its inner edge is in contact with the recess face, as shown. The inner and outer edges of the member 8 are beveled in the same direction so that the bar in cross-section is substantially in the form of a parallelogram with the point 9 at the inner edge thereof disposed at its top side and with the point 10 at the outer edge thereof disposed at its lower side as shown.

The work gripping member 8 is yieldingly held with its upper side in flat contact with the top wall of the recess 7 by one or more spring-pressed plungers 11 which are mounted in one or more sockets 12 in the bottom wall of the recess 7. A coiled compression-spring 13 is mounted in the socket with the plunger and forces the plunger upward against the member 8. The hole 14 in the upper wall of the recess 7 registers with the socket 12 and facilitates an insertion into or removal of the plunger 11 and its spring from the socket upon a removal of the member 8 from its recess. It is evident that the provision of a work gripping part of this form in each jaw of a vise or work holding means will tend to force an interposed piece of work 15 toward the base plate of the table due to the pivotal contact of the point 10 of each member 8 with the work below the plane of pivotal contact of the point 9 of each member against the base walls of the respective recess 7, the springs 12 yielding to permit a downward movement of the outer edge portions of the members 8 for such purpose.

It is found in practice that the tendency of the gripping members 8 to force the work downward during a clamping action of the jaws 2 and 3 relative thereto positively prevents the upward creeping action of the work which is so annoying in the use of planing machines, gigs and other machines in which a work-piece is clamped preparatory to planing or otherwise operating on, and obviates the necessity of frequently pounding the work down into place during the clamping action. This means also prevents the tendency of the work to creep up during a running of the machine.

We wish it understood that our invention is not limited to any specific construction or arrangement of the parts as the form shown is capable of numerous modifications and changes without departing from the spirit of the invention.

Having thus described our invention, what we claim as new, and desire to secure by Letters Patent, is,—

1. The combination with a work support and relatively adjustable vise jaws for clamping work over said support, said jaws having recessed faces, of angular pieces fulcrumed in said recesses and operable by a work clamping action of the jaws to force the engaged work piece against the support.

2. The combination with a work support and relatively adjustable jaws associated therewith, said jaws having recessed faces, of angular work gripping pieces stepped in said recesses for rocking movements relative to the jaws and operable by the application of a clamping pressure to the jaws to clamp an interposed work piece and force it inward toward the support, and means yieldingly acting on said work gripping pieces to normally retain them in one position of their rocking movements relative to the jaws.

3. The combination with a vise having a work support and a work clamping part provided with a recess in its clamping face, of a work gripping member movably projected into said recess for transverse rocking movements relative thereto, said member having opposing thrust edges which are offset one from the other in the direction of rocking movements of the member relative to said part with one edge in contact with the clamping part and with the other edge adapted to have contact with a work piece and to coöperate with the clamping part to force an engaged work piece against the support, and means yieldingly retaining said member in one position of its rocking movement relative to said clamping part.

4. The combination with a pair of clamping parts capable of relative clamping movements one toward the other, and a work support, of work gripping members carried in opposed relation by said parts for transverse rocking movements relative thereto, said members each having inner and outer thrust parts with the outer thrust parts offset from the inner thrust parts thereof in the direction of rocking movements of the members whereby to tend to force a work piece, when being clamped, against the support, and means yieldingly retaining each of said members in one position of its rocking movements.

In testimony whereof, we have hereunto signed our names to this specification in the presence of two subscribing witnesses.

CHARLES M. STREETER.
JOHN B. HECK.

Witnesses:
C. W. OWEN,
F. E. AUL.